Oct. 4, 1932. H. STEPPÉ ET AL 1,881,248
MOLD FOR MANUFACTURING BOOTS, SHOES, AND SIMILAR
ARTICLES OF RUBBER OR OTHER PLASTIC MATERIAL
Filed Jan. 22, 1931

Inventors.
Hector Steppé, Alphonse Steppé and Gustave Steppé.
per: J. Gevers
Attorney.

Patented Oct. 4, 1932

1,881,248

UNITED STATES PATENT OFFICE

HECTOR STEPPÉ, ALPHONSE STEPPÉ, AND GUSTAVE STEPPÉ, OF BERCHEM-STE.-AGATHE, BRUSSELS, BELGIUM

MOLD FOR MANUFACTURING BOOTS, SHOES, AND SIMILAR ARTICLES OF RUBBER OR OTHER PLASTIC MATERIAL

Application filed January 22, 1931, Serial No. 510,482, and in Belgium August 4, 1930.

Molds for rubber or composite rubber boots and the like are known, said molds being constituted by means of different parts which are brought together to embrace a last covered with the rubber sheets, the mold parts being assembled through the medium of bevelled slots and projections, so that pressure exerted on the top member will cause the side members to approach one another and apply lateral compression to the articles.

Now, the present invention relates to improvements of molds of the known art as mentioned before.

The improved mold, object of the present invention, is formed with four elements interengaging with one another for shaping and molding a rubber shoe of the sandal type. Said improved mold is substantially characterized by the fact that it comprises a core, a base element for shaping the sole and the heel, a crescent-shaped side element for shaping a narrow strip of the upper adjacent the heel and a cup-shaped cover engaging the core and shaping the rest of the upper, said elements interengaging with one another and being centered under the action of bevelled projections and slots provided respectively on the base, the cover and the side element.

The invention relates also to a sandal in rubber, made of one piece, obtained by vulcanization and of entirely finished formation, i. e. that said sandal can hold to the foot without necessitating any free fastening means, manufactured with the mold, according to the present invention and to the process of manufacture of such sandals under utilizing such new molds.

The invention will be described hereafter with reference to the accompanying drawing.

Figure 1:
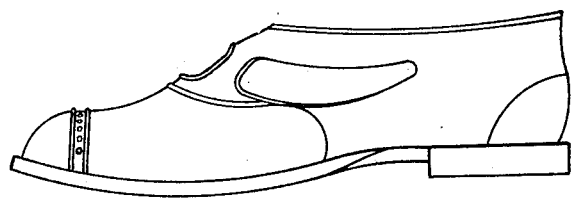
Fig. 1 is a lateral elevation of a sandal, made of one piece and manufactured by means of the improved mold.
Figure 2:
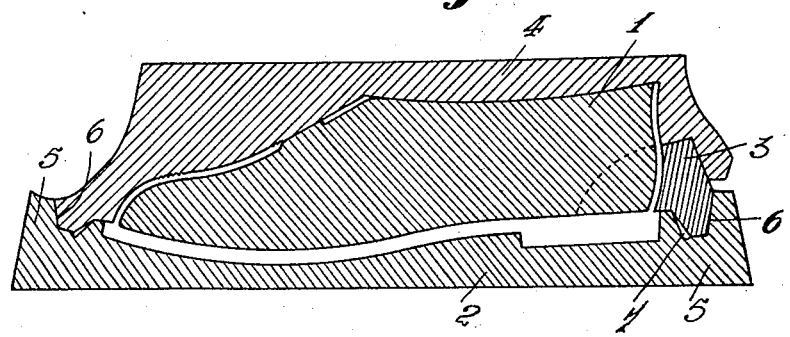
Fig. 2 is a longitudinal section of the mold.
Figure 3:
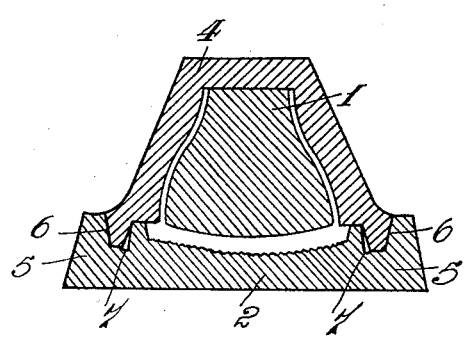
Fig. 3 is a transverse vertical section of same.

The mold comprises the core 1, around which are arranged the base element 2, the side element 3 for shaping the rear end of the upper, and the cover 4. As clearly shown in the drawing, said three elements are so shaped that they exactly adapt to the core 1, leaving the necessary space for the interposition of sheets of rubber to be vulcanized. The base element 2 is provided near its periphery with a projecting rib 5, whereof the inner bevelled edge 6 allows the engagement and the perfect centering of the elements 3 and 4. The side element 3 is provided with an outer sloping face engaged by the corresponding inner slope of the element 4.

Recesses 7 are provided specially in the base 2, for collecting the excess of rubber expulsed during vulcanization under the action of pressure.

It is obvious that the mold elements will present the projections and recesses necessary for constituting the esthetical fitting of the sandal.

The process for manufacturing sandals in rubber or composite rubber under utilizing the mold as described consists in putting a sheet of rubber onto a base element placing a core on said sheet of rubber, covering said core with the borders of said sheet, projecting over the base of said core, covering said core with a cover engaging the core partially covering with said borders, interengaging with one another and centering said core, said base element and a side element and said cover under the action of bevelled projections and slots provided respectively on said base, said cover and said side element, and heating the mold in known manner and taking out the sandal.

We claim:

A mold for rubber or composite rubber boots and the like comprising a core, a base element for shaping the sole and the heel, a crescent-shaped side element for shaping a narrow strip of the upper adjacent the heel, and a cup-shaped cover engaging the core and shaping the rest of the upper, said crescent-shaped element being wedged between the base and the cover, and bevelled projections and slots being provided respectively on the base, the cover and the side element for interengaging and centering said core, base element, side element and cover with one another.

In testimony whereof we have signed hereunto our names.

HECTOR STEPPÉ.
ALPHONSE STEPPÉ.
GUSTAVE STEPPÉ.